United States Patent
Cui et al.

(10) Patent No.: US 12,209,057 B1
(45) Date of Patent: Jan. 28, 2025

(54) PREPARATION METHOD OF POLYMER-DERIVED HIGH-TEMPERATURE CERAMIC FILM SENSOR

(71) Applicant: Lingnan Normal University, Zhanjiang (CN)

(72) Inventors: Zaifu Cui, Zhanjiang (CN); Zhenguo Lu, Zhanjiang (CN); Liwen Huang, Zhanjiang (CN); Zhonghai Wang, Zhanjiang (CN); Zitong Xu, Zhanjiang (CN); Wenjin Duan, Zhanjiang (CN); Bohuai Gou, Zhanjiang (CN); Dingyun Mao, Zhanjiang (CN); Xiaojun Chen, Zhanjiang (CN); Xin Li, Zhanjiang (CN); Guangzhou Sui, Zhanjiang (CN)

(73) Assignee: Lingnan Normal University, Zhanjiang (CN)

( * ) Notice: Subject to any disclaimer, the term of this patent is extended or adjusted under 35 U.S.C. 154(b) by 0 days.

(21) Appl. No.: 18/809,340

(22) Filed: Aug. 20, 2024

Related U.S. Application Data

(63) Continuation of application No. PCT/CN2024/103182, filed on Jul. 2, 2024.

(30) Foreign Application Priority Data

Jul. 13, 2023 (CN) .......................... 202310860565.6

(51) Int. Cl.
*C04B 35/58* (2006.01)
*C04B 35/622* (2006.01)

(52) U.S. Cl.
CPC .. *C04B 35/58071* (2013.01); *C04B 35/62218* (2013.01); *C04B 2235/3813* (2013.01)

(58) Field of Classification Search
CPC ................ G01K 7/02; C04B 35/62218; C04B 35/58071
See application file for complete search history.

(56) References Cited

PUBLICATIONS

Wu. TiB2-Modified Polymer-Derived Ceramic SiCN Double-Layer Thin Films Fabricated by Direct Writing for High-Temperature Application.Adv. Eng. Mater. 2022, 24, 2200228 (Year: 2022).*
Wu. Temperature-Independent Conductive Ceramic for High-Temperature Strain-Sensing Applications. Adv. Eng. Mater. 2023, 25, 2300516 (Year: 2023).*
Wu. Al2O3-Modified Polymer-Derived Ceramic SiCN High-Temperature Anti-Oxidative Composite Coating Fabricated by Direct Writing. Polymers 2022, 14, 3281. (Year: 2022).*

* cited by examiner

*Primary Examiner* — Matthew E. Hoban

(57) ABSTRACT

A preparation method of a polymer-derived high-temperature ceramic thin film sensor is provided. Specifically, a sensitive layer precursor layer is prepared by spraying a sensitive layer precursor liquid on an alumina substrate, and the sensitive layer precursor liquid is obtained by mixing precursor liquid with conductive powder. A protective layer precursor liquid is prepared by spraying protective layer precursor liquid on the sensitive layer precursor layer, and the protective layer precursor liquid is obtained by mixing $TiB_2$ nano-powder, insulating powder and the precursor liquid. The protective layer precursor layer, a solder and the sensitive layer precursor layer are simultaneously pyrolyzed by a one-time pyrolysis process, and thus a protective layer, the solder joints and the sensitive layer are obtained simultaneously. Thus, there is no need to pyrolyze the sensitive layer first, saving the time for pyrolyzing the sensitive layer.

10 Claims, 3 Drawing Sheets

PREPARATION METHOD OF POLYMER-DERIVED HIGH-TEMPERATURE CERAMIC FILM SENSOR

TECHNICAL FIELD

The disclosure relates to the technical field of preparation of sensors, particularly to a preparation method of a polymer-derived high-temperature ceramic film sensor.

BACKGROUND

High-temperature components of power plants, chemical plants, or aero-engines are subjected to high temperatures of hundreds or even thousands of degrees Celsius for a long time, so it is of great significance to accurately measure surface heat fluxes and temperatures of the high-temperature components for design verification and life prediction of the high-temperature components. Polymer-derived Ceramics (PDCs) have the advantages of stronger thermal shock resistance, higher temperature resistance, and lower price. A precursor of the PDC is usually liquid, this precursor can be made into polymer liquid or a slurry film by micro-jet printing, screen printing or other methods, and then the polymer liquid or the slurry film undergoes heating, curing, crosslinking and pyrolysis to thereby obtain a ceramic film, which has the characteristics of controllable sensitivity and convenient film patterning. The PDC is a semiconductor, and a resistance of the PDC decreases with the increase of temperature, which shows a certain functional relationship. Based on the thermal sensitivity of the PDC, the PDC can be used to make a thin film temperature sensor and a heat flow sensor.

Because the PDC will decompose in a pyrolysis process to release gases such as hydrogen and methane, and its linear shrinkage can reach more than 30%. Although the shrinkage can be improved by adding powder, heating and cooling rates cannot be too fast in the pyrolysis process, and the typical heating and cooling rates are in a range from 1° C./min to 5° C./min.

The preparation of a PDC sensitive film can be formed by pyrolysis at 800~1400° C. in a protective atmosphere, such as flowing nitrogen and argon atmosphere. For example, a patent publication U.S. Pat. No. 7,338,202B1 discloses that a preparation method of a PDC sensor in argon atmosphere at 1100° C. requires flowing argon atmosphere, however this method increases a process step. The PDC sensitive film can also be pyrolyzed by laser, and then a protective layer is prepared to protect the PDC sensitive film from oxidation in high-temperature air. For example, a patent pubilication CN 114974762 A discloses that a sensitive film is directly written on an alumina substrate, then the sensitive film is pyrolyzed by laser, and a protective layer is coated after laser pyrolysis, but this method requires laser heating equipment, which increases the process step and cost. There are also reports of direct pyrolysis of sensitive films in air, but an application range thereof is narrower, because it only can be used for PDC films with specific components. For example, a method (referring to Wu C, Lin F, Pan X, et al. Advanced Engineering Materials, 2022, 24 (10): 2200228) aims at specific components, and is not suitable for other sensitive layer components, so an application range thereof is narrower. In addition, for a temperature sensor on an alumina substrate, it is necessary to prepare a sensitive layer, a wire layer, a solder joints and a protective layer, which needs to perform conduct pyrolysis for 2~3 times; and for a heat flow sensor on alumina substrate, it is necessary to prepare a sensitive layer, a wire layer, solder joints, a protective layer and a thermal resistance layer, which needs to perform conduct pyrolysis for 2~3 times. It takes a lot of time to pyrolyze many times, thereby seriously reducing the preparation efficiency of thin film sensors.

SUMMARY

In view of this, the disclosure aims to provide a preparation method for rapidly preparing a polymer-derived high-temperature ceramic thin film sensor. The preparation method provided by the disclosure adopts a one-time pyrolysis process to pyrolyze a protective layer, a solder and a sensitive layer simultaneously, and has the advantages of simpler process, wider application range and higher efficiency.

In order to achieve the above objectives, the disclosure provides the following technical solutions. In an embodiment, a preparation method of a polymer-derived high-temperature ceramic thin film sensor is provided, which includes: step 1, spray printing sensitive layer precursor liquid on an alumina substrate, and heating and curing the sensitive layer precursor liquid to obtain a sensitive layer precursor layer; where the sensitive layer precursor fluid is obtained by mixing precursor fluid with conductive powder; step 2, spray printing protective layer precursor liquid on the sensitive layer precursor layer, and heating and curing the protective layer precursor liquid to obtain a protective layer precursor layer; where the protective layer precursor fluid is obtained by mixing TiB2 nano-powder, insulating powder and the precursor fluid; step 3, spot-coating a solder at a pin of the sensitive layer where a platinum wire is placed in advance, applying an alumina cap on the solder to make the alumina cap cover a part of the protective layer and all of the solder, and heating and curing the solder to thereby obtain a device; and step 4, heating the device obtained in the step 3 to a temperature of 800-1100° C. at a heating rate of 3-10° C./min, and keeping the temperature for 1-3 hours to thereby obtain the polymer-derived high-temperature ceramic thin film sensor.

In an embodiment, the precursor fluid is at least one of SiCN precursor fluid, SiAlCN precursor fluid, SiBCN precursor fluid, SiOC precursor fluid, or SiC precursor fluid.

In an embodiment, in the step 1, a mass ratio of the conductive powder to the precursor fluid is in a range from 10% to 70%.

In an embodiment, in the step 1, a thickness of the sensitive layer precursor layer is in a range from 0.2 μm to 20 μm.

In an embodiment, in the step 2, a mass ratio of the $TiB_2$ nano-powder to the precursor fluid is in a range from 10% to 50%, and a mass ratio of the insulating powder to the precursor fluid is in a range from 10% to 50%.

In an embodiment, the insulating powder is at least one of Yttria-stabilized Zirconia (YSZ), Boron Nitride (BN), MgO, $Al_2O_3$, or $Si_3N_4$.

In an embodiment, in the step 2, a thickness of the protective layer precursor layer is in a range from 10 μm to 100 μm.

In an embodiment, in the step 3: the solder is obtained by mixing $TiB_2$ nano-powder and precursor fluid; and the precursor fluid is at least one of SiCN precursor fluid, SiAlCN precursor fluid, SiBCN precursor fluid, SiOC precursor fluid, or SiC precursor fluid.

In an embodiment, in the step 3, a mass ratio of the $TiB_2$ nano-powder to the precursor fluid is in a range from 65% to 80%.

In an embodiment, the preparation method further includes preparing a thermal resistance layer precursor layer on the protective layer precursor layer.

The disclosure has at least beneficial technical effects as follows.

According to the disclosure, a certain mass fraction of nano-$TiB_2$ (also referred to as nanoscale $TiB_2$) and nano-powder with good insulation are mixed into precursor fluid to prepare a protective layer precursor layer for protecting a sensitive layer precursor layer, and the protective layer precursor layer, a solder and the sensitive layer precursor layer are pyrolyzed simultaneously by a one-time pyrolysis process. Specifically, the protective layer precursor layer and the solder can be pyrolyzed in the air, the sensitive layer precursor layer needs to be pyrolyzed in an oxygen-free environment, and a corresponding pyrolysis temperature for the pyrolysis process is in a range from 800-1,100° C. Because the protective layer precursor layer separates the air from the sensitive layer precursor layer during the pyrolysis process, and the solder can be pyrolyzed in the air owing to an antioxidant effect thereof, in this way, a protective layer, solder joints, and a sensitive layer can be obtained simultaneously through one-time pyrolysis process, thus eliminating the need to pyrolyze the sensitive layer first and saving the time for pyrolyzing the sensitive layer. Compared with the traditional pyrolysis process, the method provided by the disclosure can save more than 10 hours. Compared with the complex process and equipment of the laser pyrolysis, the method provided by the disclosure is simpler and only one-time pyrolysis process needs to be performed. The method provided by the disclosure has no requirement on the composition of the sensitive layer, so the method has wider application range and higher efficiency when preparing the film sensor.

DETAILED DESCRIPTION OF EMBODIMENTS

In the following, the technical solutions in embodiments of the disclosure will be described clearly and completely with the attached drawings. Apparently, the described embodiments are only parts of embodiments of the disclosure, but not all the embodiments. Based on the embodiments of the disclosure, all other embodiments obtained by ordinary people in the art without creative labor belong to the scope of protection of the disclosure.

The core idea of the disclosure is that a protective layer film (i.e., sensitive layer precursor layer) is adopted to protect a sensitive layer film (i.e., protective layer precursor layer), and the protective layer film and the sensitive layer film are pyrolyzed simultaneously in the process of air pyrolysis. Because the protective layer film can protect the sensitive layer film from being oxidized in the pyrolysis process, which is equivalent to that the protective layer film is pyrolyzed in the air and the sensitive layer film is pyrolyzed in an oxygen-free environment. The main reason is that the protective layer film contains a large number of $TiB_2$ nanoparticles, which are uniformly dispersed in a precursor film (i.e., precursor fluid). After the protective layer film is pyrolyzed in air, the $TiO_2$ nanoparticles are oxidized into $TiO_2$ and $B_2O_3$. When a temperature for pyrolyzing exceeds 450° C., $B_2O_3$ becomes liquid, thereby forming a dense layer of liquid $B_2O_3$ on a surface of the protective layer film. A gas released by the sensitive layer film can be released through this liquid layer, but oxygen cannot enter the sensitive layer film through this liquid layer, so the sensitive layer film is equivalent to pyrolysis in the oxygen-free environment. Nano-powder with good insulation, such as Boron Nitride (BN), MgO and $Al_2O_3$, are further filled in the protective layer to increase a resistivity of the protective layer and prevent the formation of conductive paths in the protective layer.

In addition, a material of a solder is precursor liquid filled with a large number of $TiB_2$ nanoparticles, and the solder is pyrolyzed in the air and has a stronger antioxidant function. The solder is disposed on the sensitive layer and is directly in contact with the sensitive layer. The solder can be pyrolyzed in the air at one time, and the solder is not oxidized.

Figure 1:
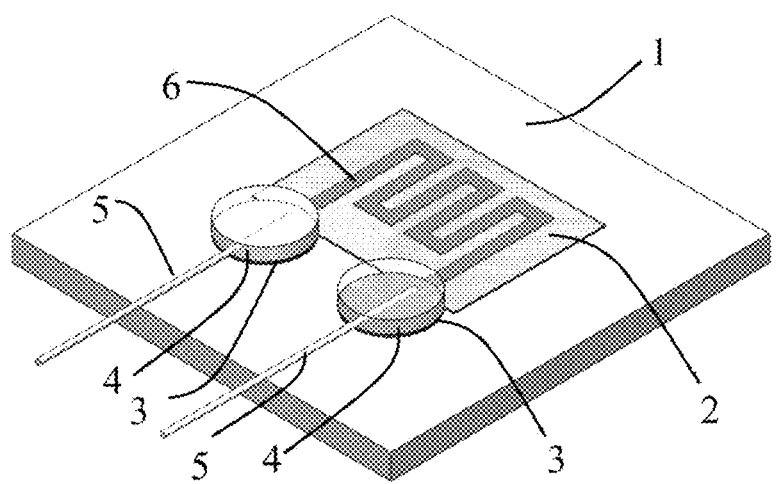
FIG. 1 illustrates a schematic structural diagram of a high-temperature ceramic thin film temperature sensor according to an embodiment of the disclosure.

Specifically, as illustrated in FIG. 1, a polymer-derived high-temperature ceramic thin film sensor of an embodiment includes an alumina substrate 1, a protective layer 2, solders 3, alumina caps 4, platinum wires 5 and a sensitive layer 6. The sensitive layer 6 is arranged on a surface of the alumina substrate 1, the protective layer 2 is disposed on the sensitive layer 6, an end of each platinum wire 5 is connected with a pin of the sensitive layer 6, and another end of the platinum wire 5 is used for external connection. Each solder 3 is spot-coated on a corresponding pin of the sensitive layer 6, and each alumina cap 4 is disposed on a corresponding solder 3 to cover a part of the protective layer 2 and all of the corresponding solder 3. The sensitive layer 6 is formed by pyrolyzing a sensitive layer precursor layer, and the protective layer is formed by pyrolyzing a protective layer precursor layer.

A preparation process flow of the polymer-derived high-temperature ceramic thin film sensor includes:

step 1, spray printing sensitive layer precursor liquid on an alumina substrate, and heating and curing the sensitive layer precursor liquid to obtain a sensitive layer precursor layer; where the sensitive layer precursor fluid is obtained by mixing precursor fluid with conductive powder;

step 2, spray printing protective layer precursor liquid on the sensitive layer precursor layer, and heating and curing the protective layer precursor liquid to obtain a protective layer precursor layer; where the protective layer precursor fluid is obtained by mixing $TiB_2$ nanopowder, insulating powder and the precursor fluid; step 3, spot-coating a solder at a pin of the sensitive layer where a platinum wire is placed in advance, applying an alumina cap on the solder to make the alumina cap cover a part of the protective layer and all of the solder, and heating and curing the solder to thereby obtain a device; and step 4, heating the device obtained in the step 3 to a temperature of 800-1100° C. at a heating rate of 3-10° C./min, and keeping the temperature for 1-3 hours to obtain the polymer-derived ceramic thin film sensor.

In the disclosure, before spray printing the sensitive layer precursor liquid on the alumina substrate, the preparation further includes pretreating the alumina substrate, which includes ultrasonic cleaning the alumina substrate and drying the alumina substrate after ultrasonic cleaning.

In the disclosure, the precursor fluid is at least one of SiCN precursor fluid, SiAlCN precursor fluid, SiBCN precursor fluid, SiOC precursor fluid, or SiC precursor fluid.

In the disclosure, in an embodiment, in the step 1, a mass ratio of the conductive powder to the precursor fluid is preferably 10% to 70%, more preferably 20% to 50%, and most preferably 30% to 40%; and a thickness of the sensitive layer precursor layer is preferably 0.2 μm to 20 μm, more preferably 1 μm to 17 μm, and most preferably 5 μm to 10 μm.

In the disclosure, in an embodiment, in the step 2, a mass ratio of the $TiB_2$ nano-powder to the precursor fluid is preferably 10% to 50%, more preferably 15% to 45%, and most preferably 20% to 35%; a mass ratio of the insulating powder to the precursor fluid is preferably 10% to 50%, more preferably 15% to 45%, and most preferably 20% to 35%; and a thickness of the protective layer precursor layer is preferably 10 μm to 100 μm, more preferably 20 μm to 70 μm, and most preferably 30 μm to 50 μm.

In the disclosure, in an embodiment, in the step 3, the solder is obtained by mixing $TiB_2$ nano-powder and precursor fluid; and the precursor fluid is at least one of SiCN precursor fluid, SiAlCN precursor fluid, SiBCN precursor fluid, SiOC precursor fluid, or SiC precursor fluid; and a mass ratio of the $TiB_2$ nano-powder to the precursor fluid is in a range from 65% to 80%.

In the disclosure, in an embodiment, the preparation method further includes preparing a thermal resistance layer precursor layer on the protective layer precursor layer. When only the protective layer precursor layer is prepared, the sensor prepared by the preparation method is a temperature sensor; when the thermal resistance layer precursor layer is also prepared on the protective layer precursor layer, the sensor prepared by the preparation method is a heat flow sensor. A preparation method of the thermal resistance layer precursor layer is consistent with the preparation method of the protective layer precursor layer.

In order to better understand the disclosure, the contents of the disclosure will be further clarified with examples below, but the contents of the disclosure are not limited to the following embodiments.

Embodiment 1

In the embodiment 1, a polymer-derived ceramic thin film sensor is prepared through the following steps.

In step 1, an alumina substrate is ultrasonically cleaned and then dried. SiCN precursor liquid and nano-graphite powder are mixed and stirred magnetically to make the SiCN precursor liquid and the nano-graphite powder be mixed uniformly to thereby obtain a first mixture, and a mass ratio of the nano-graphite powder to the SiCN precursor liquid is 40%. A grid pattern is directly written on the alumina substrate by using the first mixture and a direct writing device in the patent publication CN11096220B, and the grid pattern is heated and cured at a temperature of 170° C. to obtain a sensitive layer precursor layer with a thickness of 10 μm.

In step 2, $TiB_2$ nano-powder, $Si_3N_4$ powder and SiCN precursor fluid are mixed and stirred magnetically to make the $TiB_2$ nano-powder, the $Si_3N_4$ powder and the SiCN precursor fluid be mixed uniformly to thereby obtain a second mixture. A mass ratio of the $TiB_2$ nano-powder to the SiCN precursor fluid is 40%, and a mass ratio of the $Si_3N_4$ powder to the SiCN precursor fluid is 10%. A square pattern is directly written on the sensitive layer precursor layer obtained in the step 1 by using the second mixture and the direct writing device in the patent publication CN11096220B, with a part with a length of 2 mm of the sensitive layer precursor layer exposed. The square pattern is heated and cured at a temperature of 170° C. to obtain a protective layer precursor layer with a thickness of 30 μm.

In step 3, $TiB_2$ nano-powder and SiCN precursor liquid are mixed and stirred magnetically to make the $TiB_2$ nano-powder and the SiCN precursor fluid be mixed uniformly to thereby obtain solders, and a mass ratio of the $TiB_2$ nano-powder to the SiCN precursor liquid is 70%. The solders are spot-coated on pins of the sensitive layer precursor layer where a platinum wire is pre-placed. Alumina caps are applied on the solders respectively, and a heavy object is pressed onto the alumina caps to make the alumina caps cover a part of the protective layer and all the solders. Then, the solders are heated and cured at a temperature of 170° C. to thereby obtain a device.

In step 4, the device obtained in the step 3 is placed in a tube furnace, the device is heated (i.e., heating phase) to a heating temperature of 800° C. at a heating rate of 5° C./min, the heating temperature is kept for 1 hour, and then the device is cooled (i.e., cooling phase) to room temperature at a cooling rate of 5° C./min to thereby obtain the polymer-derived high-temperature ceramic film temperature sensor.

Figure 2:
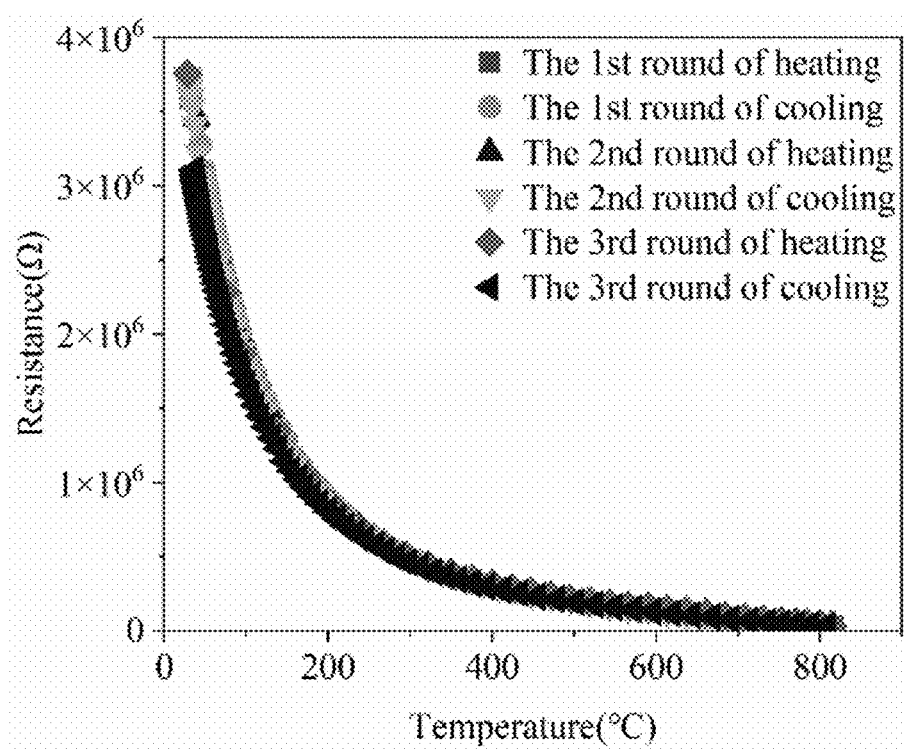
FIG. 2 illustrates a graph showing the change of a resistance with temperature of the high-temperature ceramic thin film temperature sensor prepared in an embodiment 1 under three rounds of temperature change processes.
Figure 3:
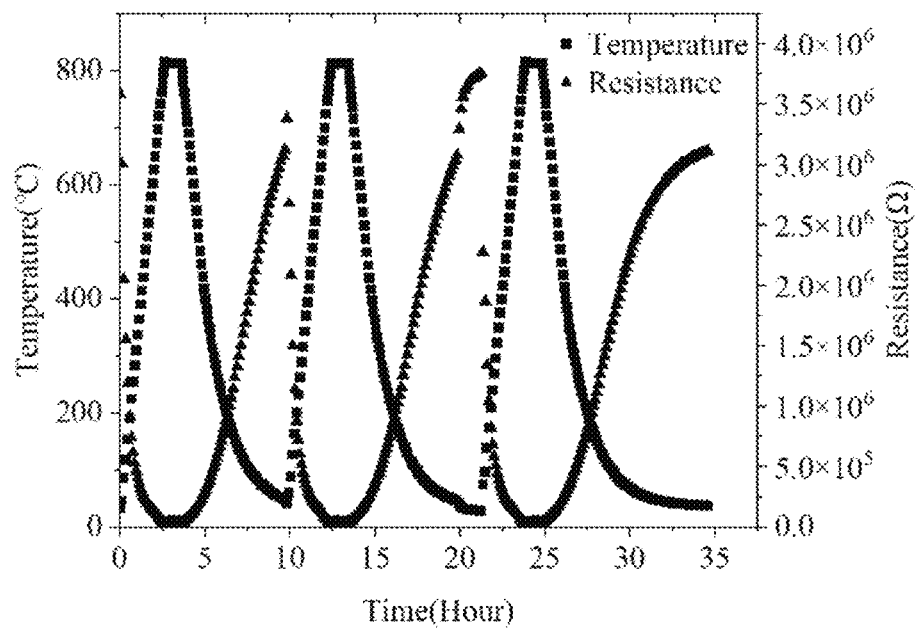
FIG. 3 illustrates a graph showing the change of a resistance and an input temperature with time of the high-temperature ceramic thin film temperature sensor prepared in the embodiment 1.

The polymer-derived high-temperature ceramic film temperature sensor is placed in the tube furnace, and external leads (i.e., platinum wires) are connected to data acquisition instruments, and a curve showing the change of a resistance with an input temperature is obtained by testing. As can be seen from FIG. 2, the repeatability of resistance is good. FIG. 3 illustrates a graph showing the change of a resistance and an input temperature with time of the thin film temperature sensor. It can be seen that the thin film temperature sensor is still stable after three rounds of 35-hour temperature cycle.

Embodiment 2

In the embodiment 2, a polymer-derived ceramic thin film sensor is prepared through following steps.

In step 1, an alumina substrate is ultrasonically cleaned and then dried. SiCN precursor liquid, nano titanium diboride powder, nano zirconium diboride and nano silicon carbide are mixed and stirred magnetically to make the SiCN precursor liquid, the nano titanium diboride powder, the nano zirconium diboride and the nano silicon carbide be mixed uniformly to thereby obtain a first mixture. A mass ratio of the nano titanium diboride powder to the SiCN precursor liquid is 20%, a mass ratio of the nano zirconium diboride to the SiCN precursor liquid is 20%, and a mass ratio of the nano silicon carbide to the SiCN precursor liquid is 10%. A grid pattern is directly written on the alumina substrate by using the first mixture and a direct writing device in the patent publication CN11096220B, and the grid pattern is heated and cured at a temperature of 170° C. to obtain a sensitive layer precursor layer with a thickness of 10 μm.

In step 2, $TiB_2$ nano-powder, $Si_3N_4$ powder and SiCN precursor fluid are mixed and stirred magnetically to make the $TiB_2$ nano-powder, the $Si_3N_4$ powder and the SiCN precursor fluid be mixed uniformly to thereby obtain a second mixture. A mass ratio of the $TiB_2$ nano-powder to the SiCN precursor fluid is 40%, and a mass ratio of the $Si_3N_4$ powder to the SiCN precursor fluid is 10%. A square pattern is directly written on the sensitive layer precursor layer obtained in the step 1 by using the second mixture and the direct writing device in the patent publication CN11096220B, with a part with a length of 2 mm of the sensitive layer precursor layer exposed. The square pattern is heated and cured at a temperature of 170° C. to obtain a protective layer precursor layer with a thickness of 30 μm.

In step 3, $TiB_2$ nano-powder and SiCN precursor liquid are mixed and stirred magnetically to make the $TiB_2$ nano-powder and the SiCN precursor fluid be mixed uniformly to thereby obtain solders, and a mass ratio of the $TiB_2$ nano-powder to the SiCN precursor liquid is 70%. The solders are spot-coated on pins of the sensitive layer precursor layer where a platinum wire is pre-placed. Alumina caps are applied on the solders respectively, and a heavy object is pressed onto the alumina caps to make the alumina caps cover a part of the protective layer and all the solders. Then, the solders are heated and cured at a temperature of 170° C. to thereby obtain a device.

In step 4, the device obtained in the step 3 is placed in a tube furnace, the device is heated (i.e., heating phase) to a heating temperature of 800° C. at a heating rate of 5° C./min, the heating temperature is kept for 1 hour, and then the device is cooled (i.e., cooling phase) to room temperature at a cooling rate of 5° C./min to thereby obtain the polymer-derived high-temperature ceramic film temperature sensor.

Figure 4:
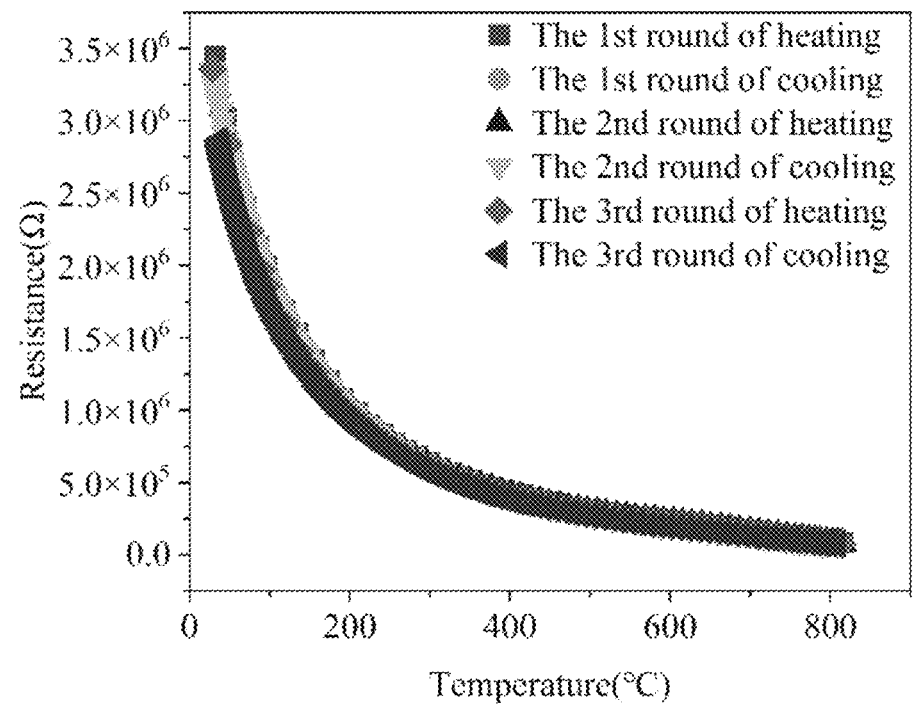
FIG. 4 illustrates a graph showing the change of a resistance with temperature of the high-temperature ceramic thin film temperature sensor prepared in an embodiment 2 under three rounds of temperature change processes.
Figure 5:
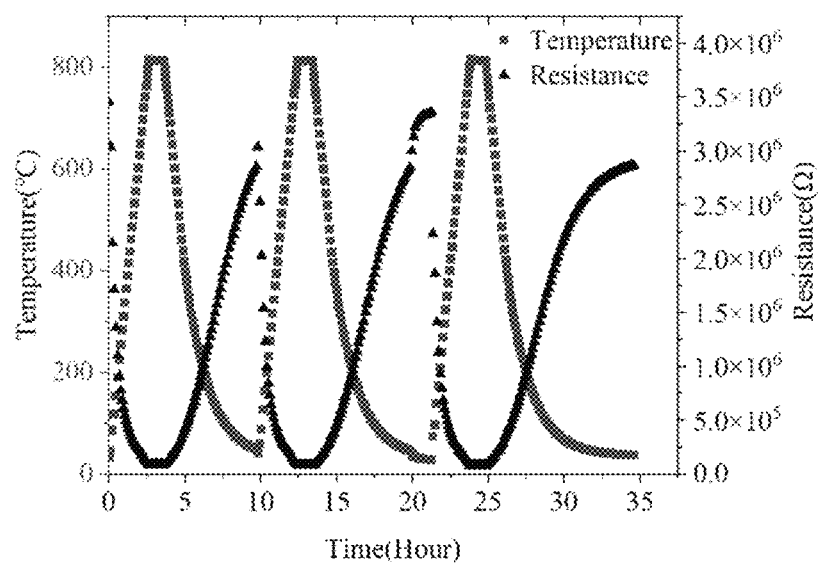
FIG. 5 illustrates a graph showing the change of a resistance and an input temperature with time of the high-temperature ceramic thin film temperature sensor prepared in the embodiment 2.

The polymer-derived high-temperature ceramic film temperature sensor is placed in the tube furnace, and external leads (i.e., platinum wires) are connected to data acquisition instruments, and a curve showing the change of a resistance with an input temperature is obtained by testing. As can be seen from FIG. 4, the repeatability of resistance is good. FIG. 5 illustrates a graph showing the change of a resistance and an input temperature with time of the thin film temperature sensor. It can be seen that the thin film temperature sensor is still stable after three rounds of 35-hour temperature cycle.

It can be seen from the above two embodiments that the process method of the disclosure has no requirement for the composition of the sensitive layer film, so it has a wider application range and higher efficiency when preparing the thin film sensor.

The above embodiments are only the illustrated embodiments of the disclosure, and it should be pointed out that a person skilled in the art can make several improvements and embellishments without departing from the principle of the disclosure, and these improvements and embellishments should also be regarded as the scope of protection of the disclosure.

What is claimed is:

1. A preparation method of a polymer-derived ceramic thin film sensor, the method comprising:
   step 1, spray printing sensitive layer precursor liquid on an alumina substrate, and heating and curing the sensitive layer precursor liquid to obtain a sensitive layer precursor layer; wherein the sensitive layer precursor fluid is obtained by mixing precursor fluid with conductive powder;
   step 2, spray printing protective layer precursor liquid on the sensitive layer precursor layer, and heating and curing the protective layer precursor liquid to obtain a protective layer precursor layer; wherein the protective layer precursor fluid is obtained by mixing $TiB_2$ nano-powder, insulating powder and the precursor fluid;
   step 3, spot-coating a solder at a pin of the sensitive layer where a platinum wire is placed in advance, applying an alumina cap on the solder to make the alumina cap cover a part of the protective layer and all of the solder, and heating and curing the solder to obtain a device; and
   step 4, heating the device obtained in the step 3 to a temperature of 800-1100° C. at a heating rate of 3-10° C./min, and keeping the temperature for 1-3 hours to obtain the polymer-derived ceramic thin film sensor.

2. The preparation method according to claim 1, wherein the precursor fluid is at least one of SiCN precursor fluid, SiAlCN precursor fluid, SiBCN precursor fluid, SiOC precursor fluid, or SiC precursor fluid.

3. The preparation method according to claim 1, wherein in the step 1, a mass ratio of the conductive powder to the precursor fluid is in a range from 10% to 70%.

4. The preparation method according to claim 1, wherein in the step 1, a thickness of the sensitive layer precursor layer is in a range from 0.2 μm to 20 μm.

5. The preparation method according to claim 1, wherein in the step 2, a mass ratio of the $TiB_2$ nano-powder to the precursor fluid is in a range from 10% to 50%, and a mass ratio of the insulating powder to the precursor fluid is in a range from 10% to 50%.

6. The preparation method according to claim 5, wherein the insulating powder is at least one of Yttria-stabilized Zirconia (YSZ), Boron Nitride (BN), MgO, $Al_2O_3$, or $Si_3N_4$.

7. The preparation method according to claim 1, wherein in the step 2, a thickness of the protective layer precursor layer is in a range from 10 μm to 100 μm.

8. The preparation method according to claim 1, wherein in the step 3: the solder is obtained by mixing $TiB_2$ nano-powder and precursor fluid; and the precursor fluid is at least one of SiCN precursor fluid, SiAlCN precursor fluid, SiBCN precursor fluid, SiOC precursor fluid, or SiC precursor fluid.

9. The preparation method according to claim 8, in the step 3, a mass ratio of the $TiB_2$ nano-powder to the precursor fluid is in a range from 65% to 80%.

10. The preparation method according to claim 1, further comprising preparing a thermal resistance layer precursor layer on the protective layer precursor layer.

* * * * *